(12) United States Patent
Hidaka

(10) Patent No.: US 12,017,643 B2
(45) Date of Patent: Jun. 25, 2024

(54) PARKING ASSIST APPARATUS

(71) Applicant: DENSO CORPORATION, Kariya (JP)

(72) Inventor: Takamasa Hidaka, Kariya (JP)

(73) Assignee: DENSO CORPORATION, Kariya (JP)

( * ) Notice: Subject to any disclaimer, the term of this patent is extended or adjusted under 35 U.S.C. 154(b) by 142 days.

(21) Appl. No.: 17/694,911

(22) Filed: Mar. 15, 2022

(65) Prior Publication Data

US 2022/0203969 A1 Jun. 30, 2022

Related U.S. Application Data

(63) Continuation of application No. PCT/JP2020/034924, filed on Sep. 15, 2020.

(30) Foreign Application Priority Data

Sep. 17, 2019 (JP) .................. 2019-168428

(51) Int. Cl.
*B60W 30/06* (2006.01)
*G08G 1/14* (2006.01)

(52) U.S. Cl.
CPC ............. *B60W 30/06* (2013.01); *G08G 1/147* (2013.01); *G08G 1/148* (2013.01)

(58) Field of Classification Search
CPC ....... B60W 30/06; G08G 1/147; G08G 1/148; G08G 1/143; G08G 1/144; G08G 1/00; G08G 1/09; G08G 1/14; G05D 2201/0213; G05D 1/0282; B62D 15/0285
USPC ...................................................... 340/932.2
See application file for complete search history.

(56) References Cited

U.S. PATENT DOCUMENTS

| | | | |
|---|---|---|---|
| 9,558,664 B1* | 1/2017 | Gaebler | G08G 1/144 |
| 10,760,925 B2* | 9/2020 | Beaurepaire | G01C 21/3492 |
| 2014/0114529 A1* | 4/2014 | An | B60R 1/00 701/36 |
| 2016/0061618 A1* | 3/2016 | Benenson | G01C 21/3453 701/428 |
| 2017/0132482 A1* | 5/2017 | Kim | G06V 20/586 |
| 2017/0144654 A1* | 5/2017 | Sham | B60W 30/06 |

(Continued)

FOREIGN PATENT DOCUMENTS

| | | | | |
|---|---|---|---|---|
| JP | 2011054116 A | | 3/2011 | |
| JP | 7240218 B2 | * | 3/2023 | ............ B60W 10/04 |
| WO | WO-2017168754 A1 | * | 10/2017 | ............ B60R 21/00 |

*Primary Examiner* — Eric Blount
(74) *Attorney, Agent, or Firm* — Harness, Dickey & Pierce, P.L.C.

(57) ABSTRACT

A parking assist apparatus includes: an entry guidance unit configured to, upon receiving a parking request for guiding an autonomous driving vehicle to a parking area in a parking lot, guide the autonomous driving vehicle from an entry initial position, which is a position of the autonomous driving vehicle immediately before starting an entry guidance, to the parking area, as a first target position; and a cancellation guidance unit configured to, upon receiving a parking cancellation request for cancelling the parking request before the autonomous driving vehicle arrives at the first target position: set a second target position that is a different position in the parking lot according to a positional relationship of a current position of the autonomous driving vehicle relative to the entry initial position; and guide the autonomous driving vehicle to the second target position.

14 Claims, 10 Drawing Sheets

(56) References Cited

U.S. PATENT DOCUMENTS

| | | | |
|---|---|---|---|
| 2017/0313306 A1* | 11/2017 | Nordbruch | G05D 1/0011 |
| 2017/0351267 A1* | 12/2017 | Mielenz | G06T 7/70 |
| 2020/0130676 A1* | 4/2020 | Smid | G05D 1/0231 |
| 2020/0132502 A1* | 4/2020 | Beaurepaire | G01C 21/3492 |
| 2020/0298835 A1* | 9/2020 | Suzuki | B62D 1/00 |

* cited by examiner

PARKING ASSIST APPARATUS

CROSS REFERENCE TO RELATED APPLICATIONS

This application is a continuation application of International Patent Application No. PCT/JP2020/034924 filed on Sep. 15, 2020, which designated the U.S. and claims the benefit of priority from Japanese Patent Application No. 2019-168428 filed on Sep. 17, 2019. The entire disclosure of all of the above application is incorporated herein by reference.

TECHNICAL FIELD

The present disclosure relates to a parking assist apparatus configured to assist parking of a vehicle and a parking assist method.

BACKGROUND ART

As the parking assist apparatus, a technique that guides an autonomous driving vehicle in a parking lot is known. For example, there has been known a configuration in which an autonomous driving vehicle is moved by autonomous driving between a parking position in a parking area where the autonomous driving vehicle is parked and a getting-on/off area where a user gets on and off the autonomous driving vehicle.

SUMMARY

According to one aspect of the present disclosure, a parking assist apparatus is configured to assist parking of an autonomous driving vehicle. The autonomous driving vehicle is configured to perform autonomous driving to a target position in a parking lot set by the parking assist apparatus. The parking assist apparatus includes: an entry guidance unit configured to, upon receiving a parking request for guiding the autonomous driving vehicle to a parking area in the parking lot, guide the autonomous driving vehicle from an entry initial position, which is a position of the autonomous driving vehicle immediately before starting an entry guidance, to the parking area, as a first target position; and a cancellation guidance unit configured to, upon receiving a parking cancellation request for cancelling the parking request before the autonomous driving vehicle arrives at the first target position: set a second target position that is a different position in the parking lot according to a positional relationship of a current position of the autonomous driving vehicle relative to the entry initial position; and guide the autonomous driving vehicle to the second target position.

DESCRIPTION OF EMBODIMENTS

Figure 1:
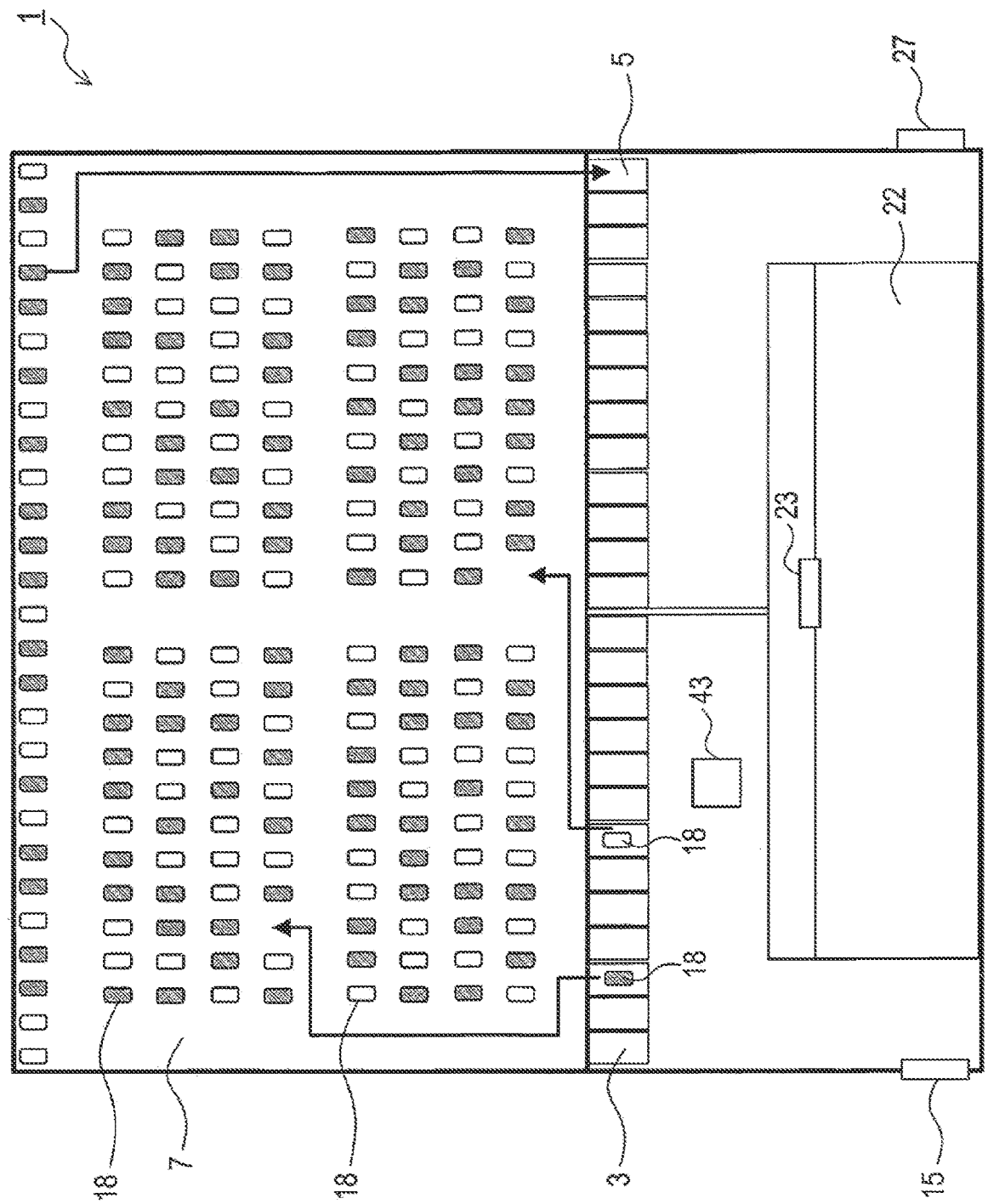
FIG. 1 is a plan view of a parking lot.

To begin with, a relevant technology will be described first only for understanding the following embodiments.

As a result of detailed studies by the inventors, in a conventional configuration, it is not assumed that the autonomous driving vehicle, while moving, stops the moving. When stopping the movement of the autonomous driving vehicle, it is preferable to appropriately set a new target position to which the autonomous driving vehicle is moved.

One objective of the present disclosure is to enable a parking assist apparatus configured to assist parking of a vehicle to move the autonomous driving vehicle to an appropriate target position when the movement of the autonomous driving vehicle is stopped.

As described above, according to the one aspect of the present disclosure, a parking assist apparatus is configured to assist parking of an autonomous driving vehicle. The autonomous driving vehicle is configured to perform autonomous driving to a target position in a parking lot set by the parking assist apparatus. The parking assist apparatus includes: an entry guidance unit configured to, upon receiving a parking request for guiding the autonomous driving vehicle to a parking area in the parking lot, guide the autonomous driving vehicle from an entry initial position, which is a position of the autonomous driving vehicle immediately before starting an entry guidance, to the parking area, as a first target position; and a cancellation guidance unit configured to, upon receiving a parking cancellation request for cancelling the parking request before the autonomous driving vehicle arrives at the first target position: set a second target position that is a different position in the parking lot according to a positional relationship of a current position of the autonomous driving vehicle relative to the entry initial position; and guide the autonomous vehicle to the second target position.

According to another aspect of the present disclosure, a parking assist method is performed by a parking assist apparatus configured to assist parking of an autonomous driving vehicle. The autonomous driving vehicle is configured to perform autonomous driving to a target position in a parking lot set by the parking assist apparatus. The parking assist method includes: upon receiving a parking request for guiding the autonomous driving vehicle to a parking area in the parking lot, guiding the autonomous driving vehicle from an entry initial position, which is a position of the autonomous driving vehicle immediately before starting an entry guidance, to the parking area, as a first target position; upon receiving a parking cancellation request for cancelling the parking request before the autonomous driving vehicle arrives at the first target position, setting a second target position that is a different position in the parking lot according to a positional relationship of a current position of the autonomous driving vehicle relative to the entry initial position; and guiding the autonomous driving vehicle to the second target position.

According to yet another aspect of the present disclosure, a parking assist apparatus is configured to assist parking of an autonomous driving vehicle. The autonomous driving vehicle is configured to perform autonomous driving to a target position in a parking lot set by the parking assist apparatus. The parking assist apparatus includes at least one processor programmed to: upon receiving a parking request for guiding the autonomous driving vehicle to a parking area in the parking lot, guide the autonomous driving vehicle from an entry initial position, which is a position of the autonomous driving vehicle immediately before starting an entry guidance, to the parking area, as a first target position; upon receiving a parking cancellation request for cancelling the parking request before the autonomous driving vehicle arrives at the first target position, set a second target position that is a different position in the parking lot according to a positional relationship of a current position of the autonomous driving vehicle relative to the entry initial position; and guide the autonomous driving vehicle to the second target position.

According to such a configuration, when the parking request is canceled, an appropriate target position can be set according to the positional relationship between the entry initial position and the current position of the autonomous driving vehicle.

Hereinafter, embodiments of the present disclosure will be described with reference to the drawings.

1. Embodiment

[1-1. Configuration of Parking Assist System 1]

A configuration of a parking assist system 1 will be described with reference to FIGS. 1 to 3. As illustrated in FIG. 1, a parking assist system 1 includes an entry room 3 set as a getting-off area which is an area where the user gets off, an exit room 5 set as a getting-on area which is an area where the user gets on, and a parking lot 7. In the following description, a region including the entry room 3, the exit room 5, and the parking lot 7 is also referred to as the parking lot.

The entry room 3 and the exit room 5 are each provided with a plurality of zones. The entry room 3 is connected to the outside of the parking assist system 1 via an entrance 15. The autonomous driving vehicle 18 can enter the entry room 3 from the outside through the entrance 15. The autonomous driving vehicle 18 has an automatic valet parking function.

The autonomous driving vehicle 18 is only required to be able to implement the automatic valet parking function in the parking lot, and does not need to have a function of performing autonomous driving outside the parking lot. The automatic valet parking function includes a function of traveling from the entry room 3 to the parking position in the parking lot 7 and parking, and a function of traveling from the parking position in the parking lot 7 to the exit room 5 by autonomous driving.

The automatic valet parking function particularly includes a function of repeatedly acquiring position information about the autonomous driving vehicle 18 and transmitting the position information to a management device 39 which is the parking assist apparatus of the present disclosure, and a function of receiving a guidance route from the management device 39, controlling the autonomous driving vehicle 18 according to the guidance route, and traveling. The position information about the autonomous driving vehicle 18 indicates an estimation result of the current position of the autonomous driving vehicle 18, and includes, for example, a coordinate value in the area of the parking lot.

The entry room 3 and the exit room 5 are adjacent to an entrance 23 of a facility 22 such as a store. An occupant of the autonomous driving vehicle 18 taken in the entry room 3 can get off the autonomous driving vehicle 18 and proceed to the entrance 23 on foot.

The exit room 5 is connected to the outside of the parking assist system 1 via an exit 27. The autonomous driving vehicle 18 can travel from the exit room 5 to the outside of the parking assist system 1 through the exit 27. The exit room 5 is adjacent to the entrance 23. The occupant can proceed from the entrance 23 to the exit room 5 on foot.

The parking lot 7 is a place where a plurality of autonomous driving vehicles 18 can be parked. A plurality of zones are provided inside the parking lot 7. Each of the zones provided in the entry room 3, the exit room 5, and the parking lot 7 is an area where one autonomous driving vehicle 18 can be parked.

The autonomous driving vehicle 18 can travel from the entry room 3 to the parking lot 7. The autonomous driving vehicle 18 can travel from the parking lot 7 to the exit room 5.

Figure 2:
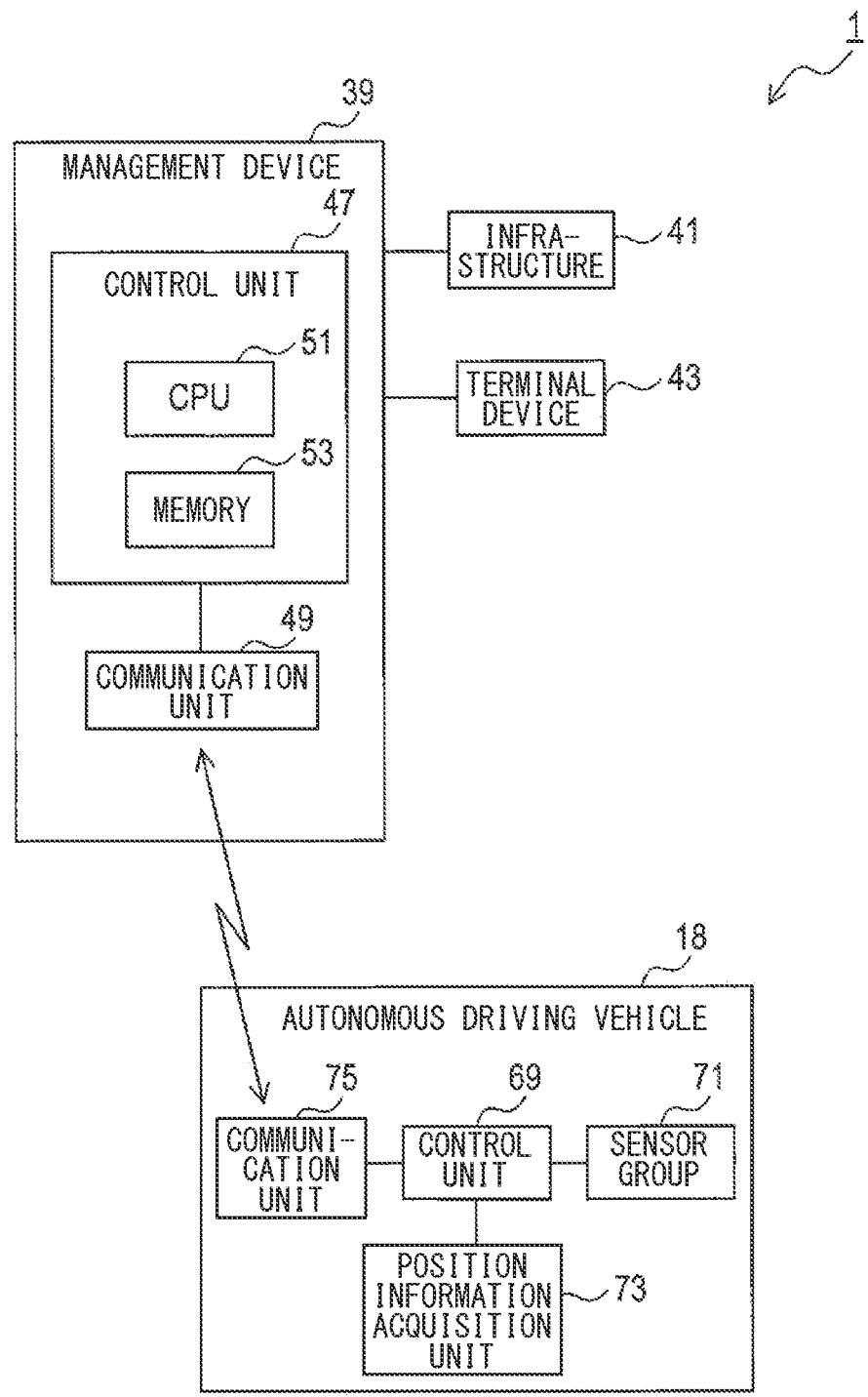
FIG. 2 is a block diagram illustrating a configuration of a parking assist system.
Figure 3:
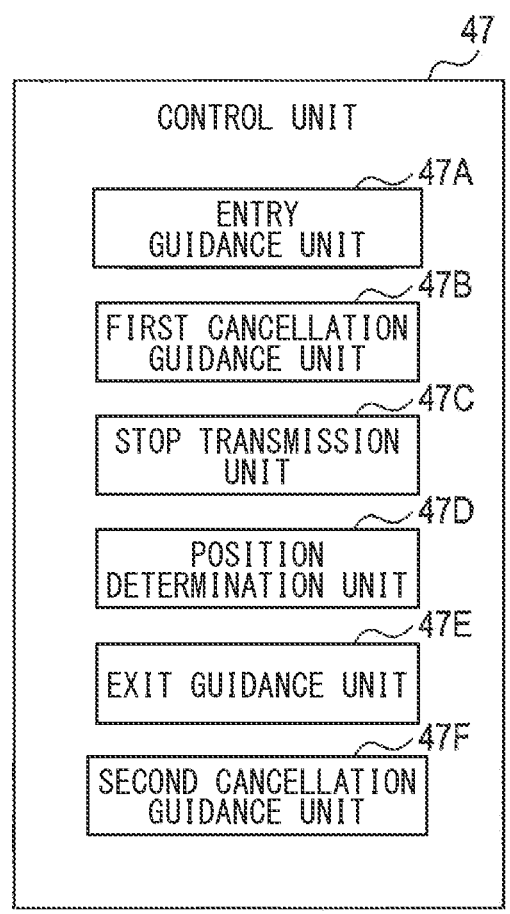
FIG. 3 is a functional block diagram of a control unit of a management device.

As illustrated in FIG. 2, the parking assist system 1 includes the management device 39, an infrastructure 41, and a terminal device 43.

The management device 39 includes a control unit 47 and a communication unit 49. The control unit 47 includes a microcomputer including a CPU 51 and a semiconductor memory (hereinafter, referred to as a memory 53) such as a RAM or a ROM.

Each function of the control unit 47 is realized by the CPU 51 executing a program stored in a non-transitory tangible recording medium. In this example, the memory 53 corresponds to a non-transitory tangible recording medium storing a program. By executing this program, a method corresponding to the program is executed. The control unit 47 may include one microprocessor or a plurality of microprocessors.

The control unit 47 includes a configuration for transmitting a guidance route to a target position to the autonomous driving vehicle 18. For example, as illustrated in FIG. 3, the control unit 47 includes an entry guidance unit 47A, a first cancellation guidance unit 47B, a stop transmission unit 47C, a position determination unit 47D, an exit guidance unit 47E, and a second cancellation guidance unit 47F. The operations of the units 47A to 47F constituting the control unit 47 will be described later.

The memory 53 stores map information about the parking lot. Further, the map information includes information indicating a state of a zone in the parking lot 7. The state of the zone includes an empty state (hereinafter referred to as a vacant state) and a state occupied by the autonomous driving vehicle 18 (hereinafter referred to as an occupied state). The communication unit 49 can communicate with the autonomous driving vehicle 18.

The infrastructure 41 acquires information indicating an internal situation of the parking assist system 1 (hereinafter referred to as parking lot inside information), and supplies the parking lot inside information to the management device 39. The infrastructure 41 includes a camera, a rider, and the like that image the inside of the parking assist system 1. The infrastructure 41 may include a camera with a photographing range including the inside of the entry room 3, a sensor with a detection range including the inside of the entry room 3, and the like.

Examples of the parking lot inside information include information indicating the position of an obstacle, information indicating the state of a zone in the parking lot 7, and position information about the autonomous driving vehicle 18 present inside the parking assist system 1.

As illustrated in FIG. 1, the terminal device 43 is installed near the entry room 3. The terminal device 43 receives an input operation by the user. The terminal device 43 outputs a signal corresponding to the input operation to the management device 39.

The terminal device 43 outputs a parking request signal in response to an input operation, for example, a parking request, that is an intention of the user to take the autonomous driving vehicle 18 in the parking-slot. The parking request signal is a signal for requesting the autonomous driving vehicle 18 in the entry room 3 to be conveyed to the parking lot 7 and parked. When outputting a signal corresponding to the input operation to the management device 39, the terminal device 43 outputs identification information or the like of the autonomous driving vehicle 18.

The terminal device 43 outputs an exit request signal in response to an input operation, for example, an exit request, that is an intention of the user to take the autonomous driving vehicle 18 out of the parking-slot. The exit request signal is a signal for requesting conveyance of the autonomous driving vehicle 18 parked in the parking lot 7 to the exit room 5.

The terminal device 43 outputs identification information about the autonomous driving vehicle 18 in response to, for example, an input operation. The identification information is, for example, information such as a number plate for uniquely identifying the autonomous driving vehicle 18.

After outputting the parking request signal, the terminal device 43 can receive an input operation that is an intention of taking the vehicle out of the parking slot before the autonomous driving vehicle 18 arrives in the parking lot 7. Further, after outputting the exit request signal, the terminal device 43 can receive an input operation that is an intention of taking the vehicle in the parking slot before the autonomous driving vehicle 18 arrives in the exit room 5.

The terminal device 43 may be a mobile terminal held by the user, such as a mobile phone, a smartphone, or a tablet. The mobile terminal is communicably connected to the management device 39 via a data communication network such as the Internet or a local area network. The mobile terminal outputs a parking request signal or an exit request signal in response to an input operation by the user.

Furthermore, the mobile terminal may include a display unit capable of displaying an image, and may accept an input operation by the user by the user touching the image displayed on the display unit. The mobile terminal may set an image to be displayed on the display unit and a signal to be output in advance in association with each other, to output a signal corresponding to the image selected by the user. That is, the user may select a signal output from the mobile terminal by selecting an image corresponding to a desired signal on the display unit.

As described above, the autonomous driving vehicle 18 has the automatic valet parking function. As illustrated in FIG. 2, the autonomous driving vehicle 18 includes a control unit 69, a sensor group 71, a position information acquisition unit 73, and a communication unit 75. The control unit 69 controls each unit of the autonomous driving vehicle 18. The function of the autonomous driving is realized by the control performed by the control unit 69. The autonomous driving vehicle 18 acquires map information and a guidance route of the parking lot from the management device 39, and uses the map information and the guidance route of the parking lot when performing autonomous driving.

The sensor group 71 acquires surrounding information indicating a surrounding situation of the autonomous driving vehicle 18. The content of the surrounding information includes, for example, a position of an obstacle present around the autonomous driving vehicle 18. The sensor group 71 includes, for example, a camera, a rider, and the like. The autonomous driving vehicle 18 uses surrounding information when performing autonomous driving.

The position information acquisition unit 73 acquires position information about the autonomous driving vehicle 18. The position information acquisition unit 73 is, for example, a position estimation system using a rider and a map. The autonomous driving vehicle 18 uses position information when performing autonomous driving. The communication unit 75 can communicate with the management device 39.

[1-2. Process]
[1-2-1. Parking Setting Process Performed by Management Device 39]

Figure 4:
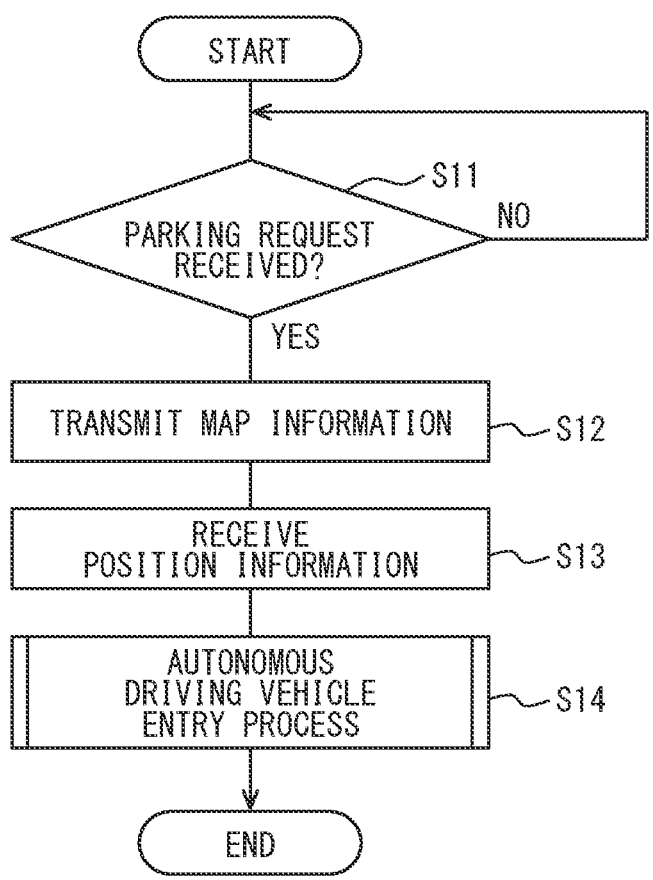
FIG. 4 is a flowchart of a parking setting process performed by the management device.

The parking setting process performed by the management device 39 will be described with reference to FIG. 4. The parking setting process is, for example, a process that is started when the management device 39 is powered on and then repeatedly performed.

The entry guidance unit 47A of the management device 39 determines whether a parking request signal has been received in step 11 of the parking setting process illustrated in FIG. 4 (hereinafter referred to as "S").

When a user such as an occupant of the autonomous driving vehicle 18 operates the terminal device 43 to input a parking request, the terminal device 43 transmits a parking request signal corresponding to this input to the management device 39. At this time, the user inputs vehicle information such as a number plate for identifying the vehicle, user information such as a user ID and a password for identifying the user, and other necessary information to the terminal device 43. After operating the parking request, the user can leave the parking lot and go to the destination.

The entry guidance unit 47A transmits map information about the parking lot to the autonomous driving vehicle 18 in S12. That is, when the user inputs to start parking with the terminal device 43, the entry guidance unit 47A transmits map information about the parking lot to the autonomous driving vehicle 18. Even when receiving an exit request to be described later after the parking request and before the parking is completed, the entry guidance unit 47A transmits map information about the parking lot to the autonomous driving vehicle 18.

The autonomous driving vehicle 18 that has received the map information is set so as to return the position information as described later. The entry guidance unit 47A receives the position information transmitted from the autonomous driving vehicle 18 in S13. The process proceeds to S14, and the control unit 47 performs an autonomous driving vehicle entry process. The autonomous driving vehicle entry process is a process of moving the autonomous driving vehicle 18 to the parking position. When the autonomous driving vehicle entry process ends, the management device 39 ends the parking setting process.

[1-2-2. Autonomous Driving Vehicle Entry Process]

Figure 5:
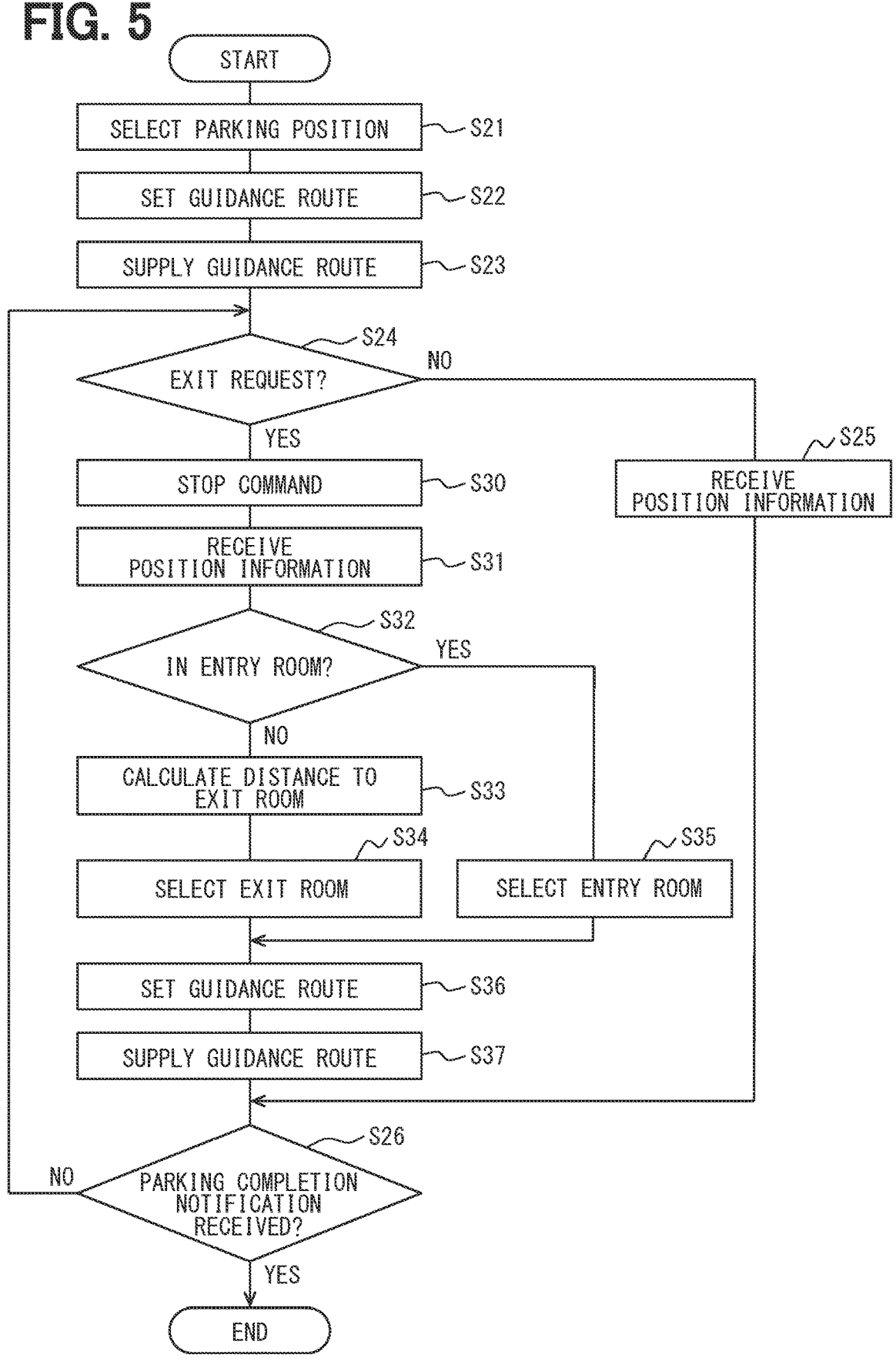
FIG. 5 is a flowchart of an autonomous driving vehicle entry process in the parking setting process.

The autonomous driving vehicle entry process performed by the management device 39 will be described with reference to FIG. 5. In the autonomous driving vehicle entry process, first, in S21, the entry guidance unit 47A selects a parking position to be a target position which is an end point of the guidance route. The target position here is a first target position of the present disclosure.

As the parking position, a zone in a vacant state in the parking lot 7 is selected. For example, the entry guidance unit 47A determines the state of each zone as follows. When parking in a certain zone, the autonomous driving vehicle 18 transmits identification information about the zone and parking start information to the management device 39. When leaving the zone where the autonomous driving vehicle 18 has been parked, the autonomous driving vehicle transmits identification information about the zone and parking end information to the management device 39.

The entry guidance unit 47A determines the state of each zone based on the history of the information transmitted from the autonomous driving vehicle 18. The entry guidance unit 47A may determine the state of each zone based on the information supplied by the infrastructure 41.

In a case where only one zone is in the vacant state, the entry guidance unit 47A sets the zone as the parking position. In a case where there is a plurality of zones that is in a vacant state, the entry guidance unit 47A selects one zone from among the plurality of zones that is in a vacant state as the parking position based on a predetermined standard. Examples of the criteria include a criterion for selecting a zone closest to the entry room 3, a criterion for selecting a zone closest to the exit room 5, and a criterion for selecting a zone in an area where zones in a vacant state are gathered.

In S22, the entry guidance unit 47A sets a guidance route using the map information about the parking lot. The entry guidance unit 47A sets a guidance route for the autonomous driving vehicle 18 to self-travel, and sets a route from the current position of the autonomous driving vehicle 18, that is, the entry initial position indicating the position of the autonomous driving vehicle 18 before the start of movement to the parking position selected in the above-described S21. In S23, the entry guidance unit 47A transmits information indicating the guidance route set in S22 (hereinafter referred to as guidance route information) to the autonomous driving vehicle 18 using the communication unit 49.

The guidance route information transmitted in S23 also serves as an instruction to start parking for the autonomous driving vehicle 18. As will be described later, the autonomous driving vehicle 18 receives the guidance route information and starts automated driving following the guidance route.

In S24, the first cancellation guidance unit 47B of the management device 39 determines whether there is an exit request signal. That is, it is determined whether the exit request signal based on the user's exit request has been received after the parking request and before the autonomous driving vehicle 18 arrives in the parking position. The exit request corresponds to a parking cancellation request which is a request to cancel the parking request.

When the first cancellation guidance unit 47B determines that there is no exit request in S24, the entry guidance unit 47A acquires position information about the autonomous driving vehicle 18 in S25, and the process proceeds to S26.

In S26, the entry guidance unit 47A or the exit guidance unit 47E determines whether the communication unit 49 has received the parking completion notification. The parking completion notification is a notification transmitted by the autonomous driving vehicle 18 when the autonomous driving vehicle 18 is parked at the target position.

The target position is a parking position when there is no exit request after the parking request, and in this case, the entry guidance unit 47A performs the process of S26. The target position is the entry room 3 or the exit room 5 when there is an exit request after the parking request, and in this case, the first cancellation guidance unit 47B performs the process of S26.

When the parking completion notification is received, this process ends. When the parking completion notification has not been received, the process returns to S24.

When the first cancellation guidance unit 47B determines in S24 that there is the exit request, the process proceeds to S30. In the processing after S30, a new target position is set at a different position in the parking lot according to whether a preset condition regarding the positional relationship between the entry initial position and the current position of the autonomous driving vehicle 18 is satisfied, and the autonomous driving vehicle 18 is guided to the new target position. The positional relationship between the entry initial position and the current position of the autonomous driving vehicle 18 can also be referred to as a position of the current position of the autonomous driving vehicle 18 relative to the entry initial position. The new target position set in S34 and S35 described later is a second target position of the present disclosure.

Specifically, first, in S30, the stop transmission unit 47C of the management device 39 transmits a stop command to the autonomous driving vehicle 18. That is, when the management device 39 receives a parking cancellation request such as an exit request, the stop transmission unit 47C transmits a stop command to the autonomous driving vehicle 18 before the first cancellation guidance unit 47B sets a new target position. At this time, the stop transmission unit 47C transmits the stop command without judging the traveling state of the autonomous driving vehicle 18. When the autonomous driving vehicle 18 receives the stop command, the autonomous driving vehicle 18 is immediately stopped.

In S31, the first cancellation guidance unit 47B receives the position information. This process is similar to that in S25. In S32, the position determination unit 47D of the management device 39 determines whether the current position of the autonomous driving vehicle 18 is within the zone of the entry room 3 where the vehicle was stopped before the start of movement. In this process, for example, an affirmative determination is made when at least part of the autonomous driving vehicle 18 is located in a zone of the entry room 3 where the vehicle was stopped before the start of movement, and a negative determination is made when the entire autonomous driving vehicle 18 is located outside the zone.

For example, the position determination unit 47D may determine whether the autonomous driving vehicle 18 is within the zone of the entry room 3 where the vehicle was stopped before the start of the movement based on information from a camera with a photographing range including the inside of the zone of the entry room 3 or a sensor with a detection range including the inside of the zone of the entry room 3.

When the position determination unit 47D determines that the current position of the autonomous driving vehicle 18 is outside the zone of the entry room 3, the process proceeds to S33, and the first cancellation guidance unit 47B calculates the distance to each zone in the vacant state of the exit room 5. In S34, the first cancellation guidance unit 47B sets the exit room 5 to a new target position. For example, first cancellation guidance unit 47B sets the closest zone among the zones in the vacant state of exit room 5 as a new target position. After this process, the process proceeds to S36. The closest zone may be a zone to which the vehicle can arrive in the shortest time or a zone for which the route length along the guidance route the shortest.

That is, when the current position of the autonomous driving vehicle 18 is outside the zone of the entry room 3, there is a possibility that another vehicle enters the zone of the entry room 3. Therefore, in order to avoid contact between the autonomous driving vehicle 18 and a vehicle entry into the zone of the entry room 3, the first cancellation guidance unit 47B configured to guide the autonomous driving vehicle 18 to the exit room 5.

On the other hand, when the position determination unit 47D determines in S32 that the current position of the autonomous driving vehicle 18 is within the zone of the entry room 3, the process proceeds to S35, and the first cancellation guidance unit 47B sets the entry room 3 as a new target position. That is, when it is determined that the current position of the autonomous driving vehicle 18 is within the zone of the entry room 3 where the vehicle was stopped before the start of movement, there is a low possibility that another vehicle enters this zone, and thus, a new target position is set so that the vehicle stays within this zone of the entry room 3.

In S36, the first cancellation guidance unit 47B sets a guidance route. This process is similar to that in S22. In S37, the first cancellation guidance unit 47B supplies a guidance route. This process is similar to that in S23. After this process, the process proceeds to S26 described above. When the parking completion notification is received in S26, this process ends.

[1-2-3. Automatic Parking Process Performed by Autonomous Driving Vehicle 18]

Figure 6:
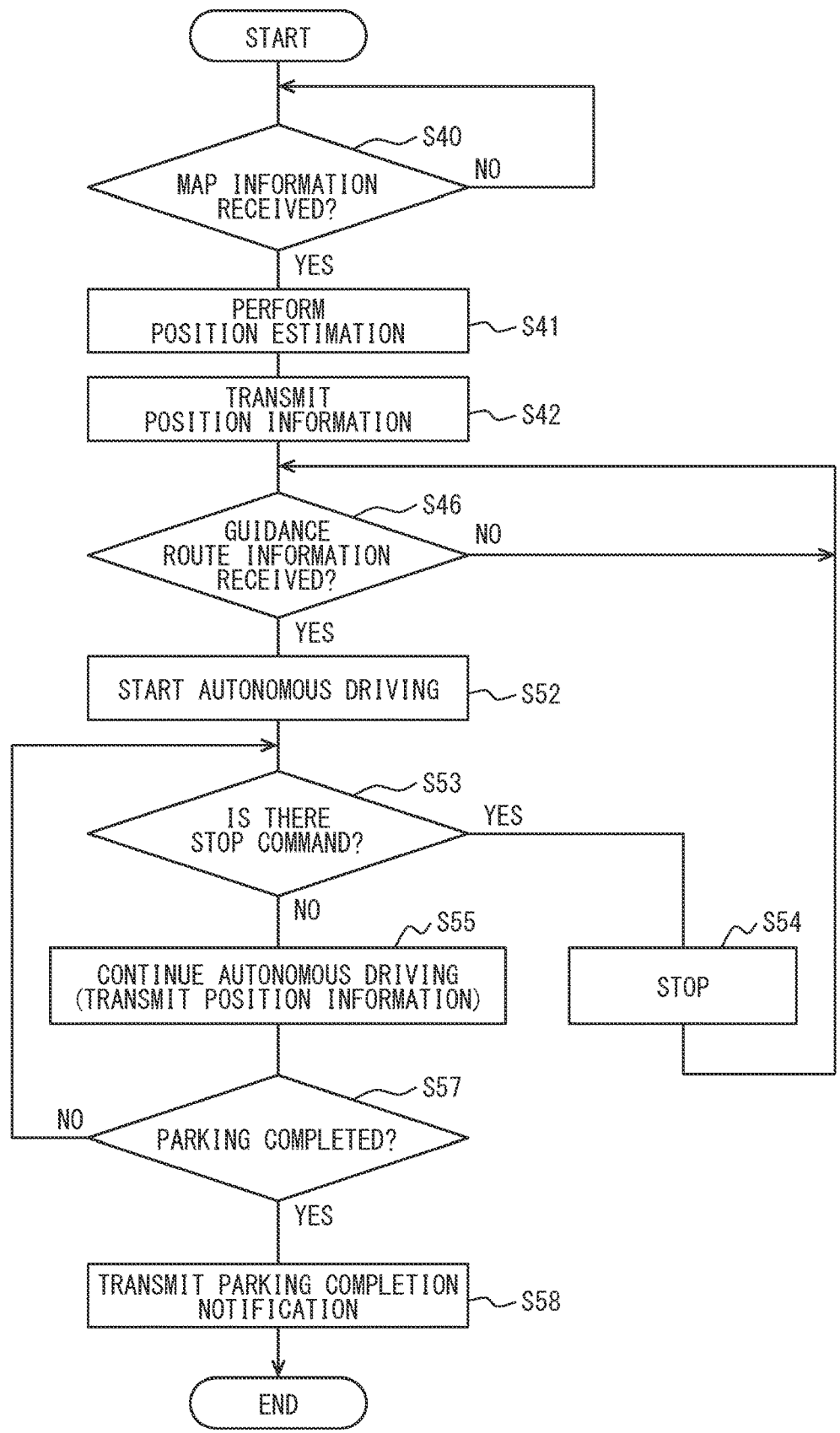
FIG. 6 is a flowchart of an automatic parking process performed by the autonomous driving vehicle.

The automatic parking process performed by the autonomous driving vehicle 18 will be described with reference to FIG. 6. The automatic parking process is a process in which the autonomous driving vehicle 18 automatically drives from the entry room 3 to the parking position according to the autonomous driving vehicle entry process performed by the management device 39. However, there is a case where the target position is changed and the automatic driving is performed to the entry room 3 or the exit room 5.

First, in S40, the control unit 69 of the autonomous driving vehicle 18 determines whether the communication unit 75 has received map information about the parking lot. When the map information is not received, the process returns to S40.

When the map information is received, the process proceeds to S41, and the control unit 69 estimates the current position of the autonomous driving vehicle 18. In S42, the control unit 69 transmits the estimation result of the current position as the position information about the autonomous driving vehicle 18 to the management device 39.

In S46, the control unit 69 determines whether the guidance route information has been received. The guidance route information is transmitted by the management device 39. In S46, when the guidance route information has not been received, the process returns to S46.

In S46, when the guidance route information has been received, the control unit 69 starts autonomous driving of the autonomous driving vehicle 18 in S52. When performing autonomous driving, the control unit 69 causes the autonomous driving vehicle 18 to travel along a guidance route included in the guidance route information.

In S53, the control unit 69 determines whether a stop command has been received. The stop command is transmitted by the management device 39. When the stop command has been received, the process proceeds to S54, and the control unit 69 stops the autonomous driving vehicle 18 and the process returns to S46. After the autonomous driving vehicle 18 is stopped in S54, the control unit 69 transmits the position information about the autonomous driving vehicle 18 to the management device 39.

When the stop command has not been received in S53, the control unit 69 continues the autonomous driving of the autonomous driving vehicle 18 in S55. At this time, the control unit 69 repeatedly transmits the position information about the autonomous driving vehicle 18 to the management device 39 until it is determined in S57 that parking is completed described later. The transmitted position information is received by the management device 39.

In S57, the control unit 69 determines whether parking has been completed. The completion of parking means that the autonomous driving vehicle 18 arrives at the parking position set by the management device 39. When the parking position is set to the target position and then the target position is changed, the control unit 69 also determines that parking is completed even when the autonomous driving vehicle 18 arrives at the new target position after the change. When parking is not completed, the process returns to S53.

In a case where parking is completed, the process proceeds to S58, and the control unit 69 transmits a parking completion notification through the communication unit 75, and ends this process. The management device 39 receives the transmitted parking completion notification.

[1-2-4. Exit Setting Process Performed by Management Device 39]

Figure 7:
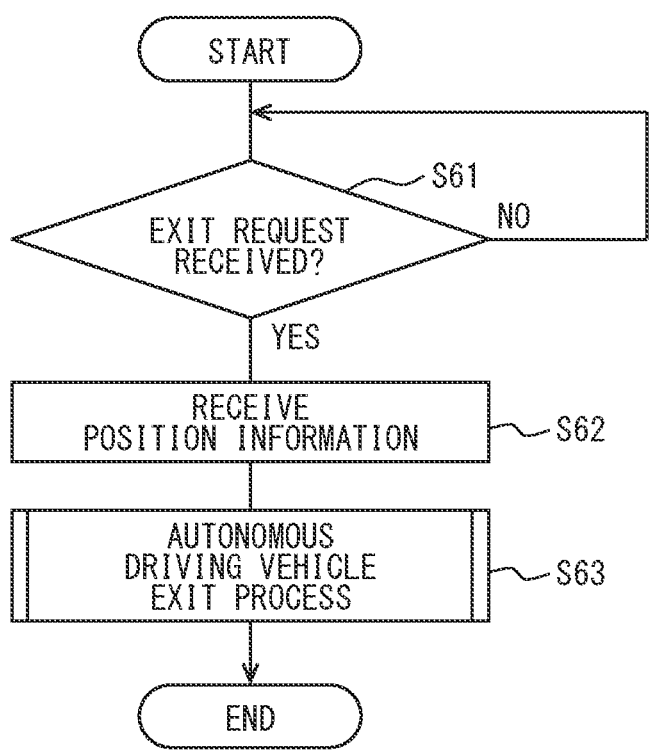
FIG. 7 is a flowchart of an exit setting process performed by the management device.

The exit setting process performed by the management device 39 will be described with reference to FIG. 7. The exit setting process is a process of moving the autonomous driving vehicle 18 from the parking position to the exit room 5 by self-traveling of the autonomous driving vehicle 18. However, there is a case where the target position is changed and autonomous driving is performed to the parking position.

The exit setting process is a process that the control unit 47 of the management device 39 repeatedly performs in parallel with other processes, for example. In the exit setting process, first, in S61, the exit guidance unit 47E of the management device 39 determines whether an exit request signal has been received. The exit request signal is transmitted by the terminal device 43.

When there is no exit request signal, S61 is repeated. When the exit request signal is present, the position information transmitted from the autonomous driving vehicle 18 is received in S62. In S63, the control unit 47 performs an autonomous driving vehicle exit process. The autonomous driving vehicle exit process is a process of moving the autonomous driving vehicle 18 to the exit room 5. When this process ends, the control unit 47 ends this process.

[1-2-5. Autonomous Driving Vehicle Exit Process]

Figure 8:
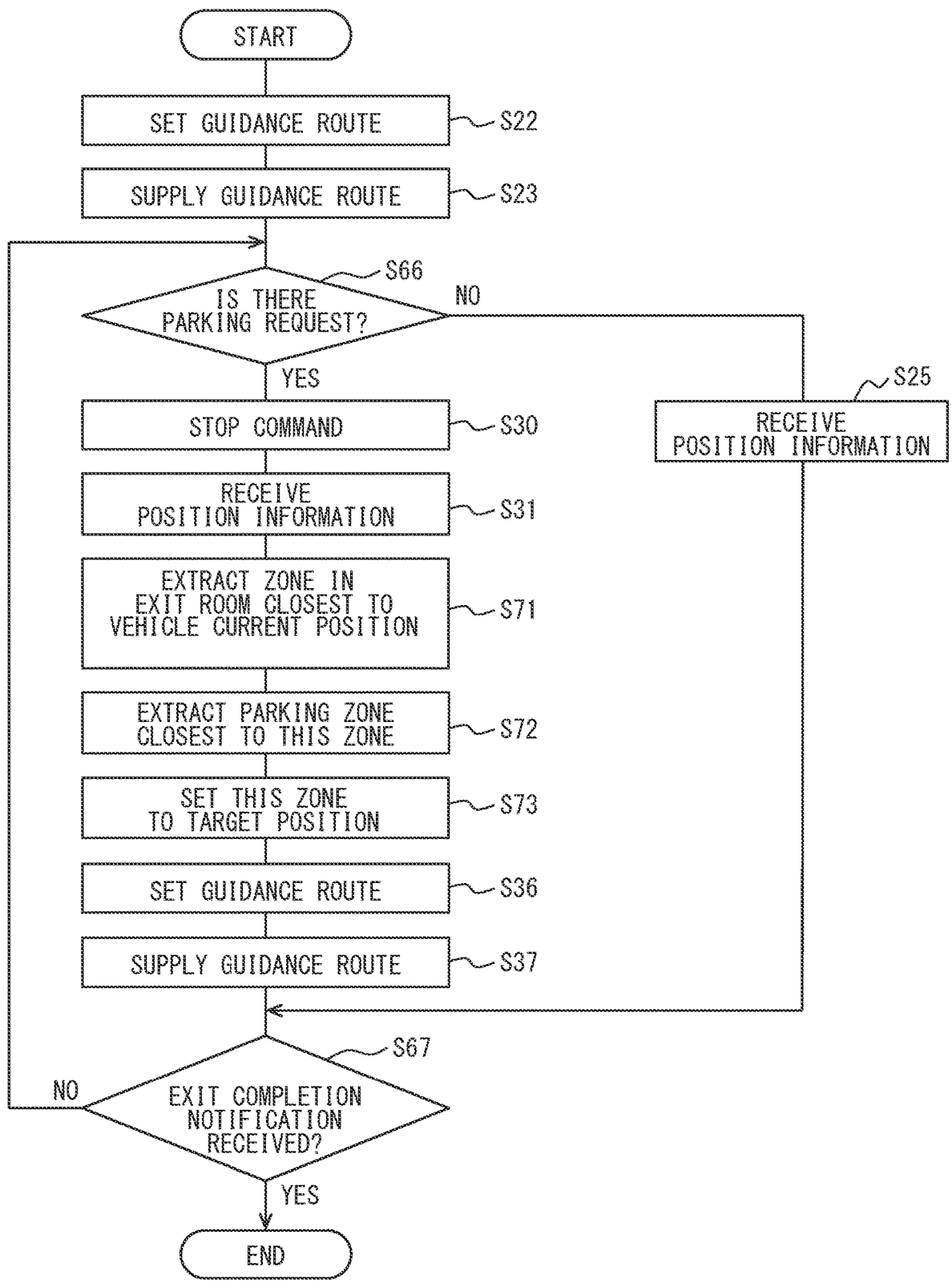
FIG. 8 is a flowchart of an autonomous driving vehicle exit process in the exit setting process.

The autonomous driving vehicle exit process performed by the management device 39 will be described with reference to FIG. 8. In the autonomous driving vehicle exit process, as illustrated in FIGS. 8, S22 and S23 in the autonomous driving vehicle entry process (FIG. 5) described above are performed. The target position set in S22 is a third target position of the present disclosure.

In S22 of the autonomous driving vehicle exit process, the exit guidance unit 47E selects a zone, in the exit room 5, which is the target position that is the end point of the guidance route. The target position here corresponds to a third target position of the present disclosure. In S22 of the autonomous driving vehicle exit process, the exit guidance unit 47E sets a route from the current position of the autonomous driving vehicle 18, that is, the parking position indicating the position of the autonomous driving vehicle 18 before the start of movement to the zone in the vacant state in the exit room 5. In S23 of the autonomous driving vehicle exit process, the exit guidance unit 47E transmits information indicating the set guidance route (that is, it corresponds to the guidance route information) to the autonomous driving vehicle 18 through the communication unit 49. The transmitted guidance route information also serves as an instruction to start parking for the autonomous driving vehicle 18.

After S23, the second cancellation guidance unit 47F of the management device 39 determines whether there is a parking request signal in S66. That is, it is determined whether a parking request signal based on the parking request has been received after the exit request and before the autonomous driving vehicle 18 arrives in the exit room 5. The parking request here corresponds to an exit cancellation request which is a request to cancel the exit request.

When there is no parking request signal, the exit guidance unit 47E performs the process of S25 described above, and the process proceeds to S67 described later. When there is the parking request signal, the process of S30 and S31 described above is performed. The process of S30 at the time of exit is performed by the stop transmission unit 47C of the management device 39 as in the time of entry. That is, when the management device 39 receives the exit cancellation request, the stop transmission unit 47C transmits a stop command to the autonomous driving vehicle 18 before the first cancellation guidance unit 47B sets a new target position. At this time, the stop transmission unit 47C transmits the stop command without judging the traveling state of the autonomous driving vehicle 18.

In S71, the second cancellation guidance unit 47F extracts a zone in the exit room 5. The extracted zone in the exit room 5 is the zone closest to the current position of the autonomous driving vehicle 18 among the zones in the vacant state in the exit room 5.

In S72, second cancellation guidance unit 47F extracts a parking zone. The parking zone extracted here is a zone closest to the extracted zone in the exit room 5 among the zones in the parking lot 7 in the vacant state.

In S73, second cancellation guidance unit 47F sets the parking zone to the target position. The new target position set in S73 is a fourth target position of the present disclosure. The second cancellation guidance unit 47F performs the processing in S36 and S37 described above, and the process proceeds to S67.

In S67, the second cancellation guidance unit 47F determines whether the exit completion notification has been received. The exit completion notification is a notification transmitted from the autonomous driving vehicle 18 when the autonomous driving vehicle 18 arrives in the exit room 5 which is the target position. The exit completion notification is a notification transmitted by the autonomous driving vehicle 18 when the autonomous driving vehicle 18 is parked at the target position which is the end point of the guidance route.

When there is no parking request after the exit request, the target position is the exit room 5, and in this case, the exit guidance unit 47E performs the process of S67. The target position is the parking lot 7 when there is a parking request after the exit request, and in this case, the second cancellation guidance unit 47F performs the process of S67.

When the exit completion notification has not been received, the process returns to S66, and when the exit completion notification has been received, the process ends.

A modification in which the second cancellation guidance unit 47F extracts a parking zone will be described.

Figure 10:
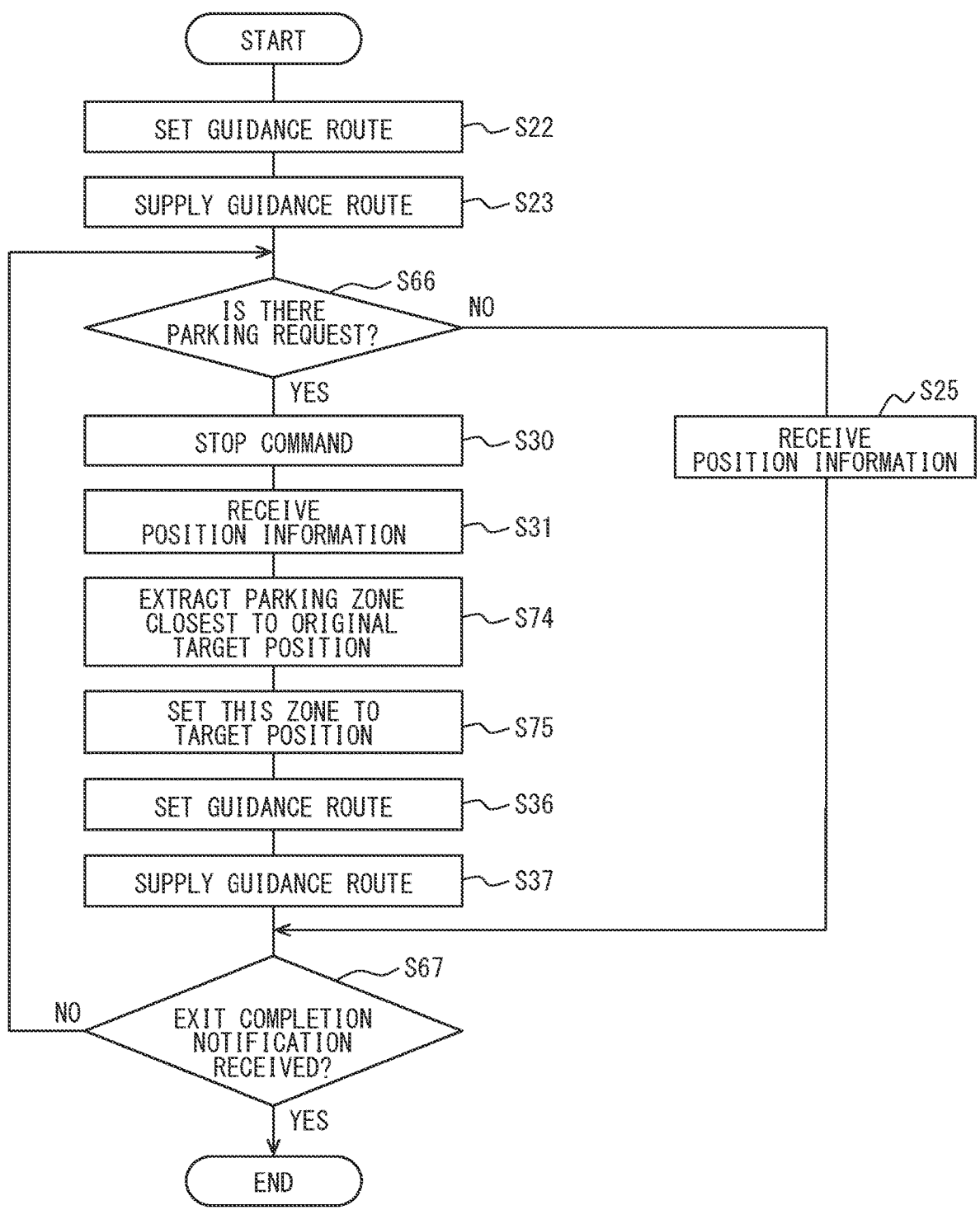
FIG. 10 is a flowchart of an autonomous driving vehicle exit process in the exit setting process.

According to the modification, the second cancellation guidance unit 47F sets a new target position in the parking zone closest to the target position selected in S22 of the autonomous driving vehicle exit process. FIG. 10 is a flowchart of the autonomous driving vehicle exit process in the exit setting process according to the modification. The process not described below is similar to the autonomous driving vehicle exit process described with reference to FIG. 8.

As in FIG. 8, in S22 of the autonomous driving vehicle exit process, the exit guidance unit 47E selects a zone (that is, it corresponds to the third target position) in the exit room 5, which is the target position that is the end point of the guidance route.

In S31, second cancellation guidance unit 47F receives the position information.

In S74, second cancellation guidance unit 47F extracts a parking zone. The parking zone extracted in S74 is a zone closest to the third target position among the zones in the vacant state in the parking lot 7. In S75, the second cancellation guidance unit 47F sets the parking zone to the target position. The new target position set in S75 is an example of the fourth target position of the present disclosure.

The second cancellation guidance unit 47F performs the processing in S36 and S37 described above, and the process proceeds to S67.

[1-2-6. Automatic Exit Process Performed by Autonomous Driving Vehicle 18]

The automatic exit process performed by the autonomous driving vehicle 18 will be described with reference to FIG. 9. The automatic exit process is a process of causing the autonomous driving vehicle 18 to travel from the parking position to the exit room 5 in accordance with the autonomous driving vehicle exit process performed by the management device 39.

Figure 9:
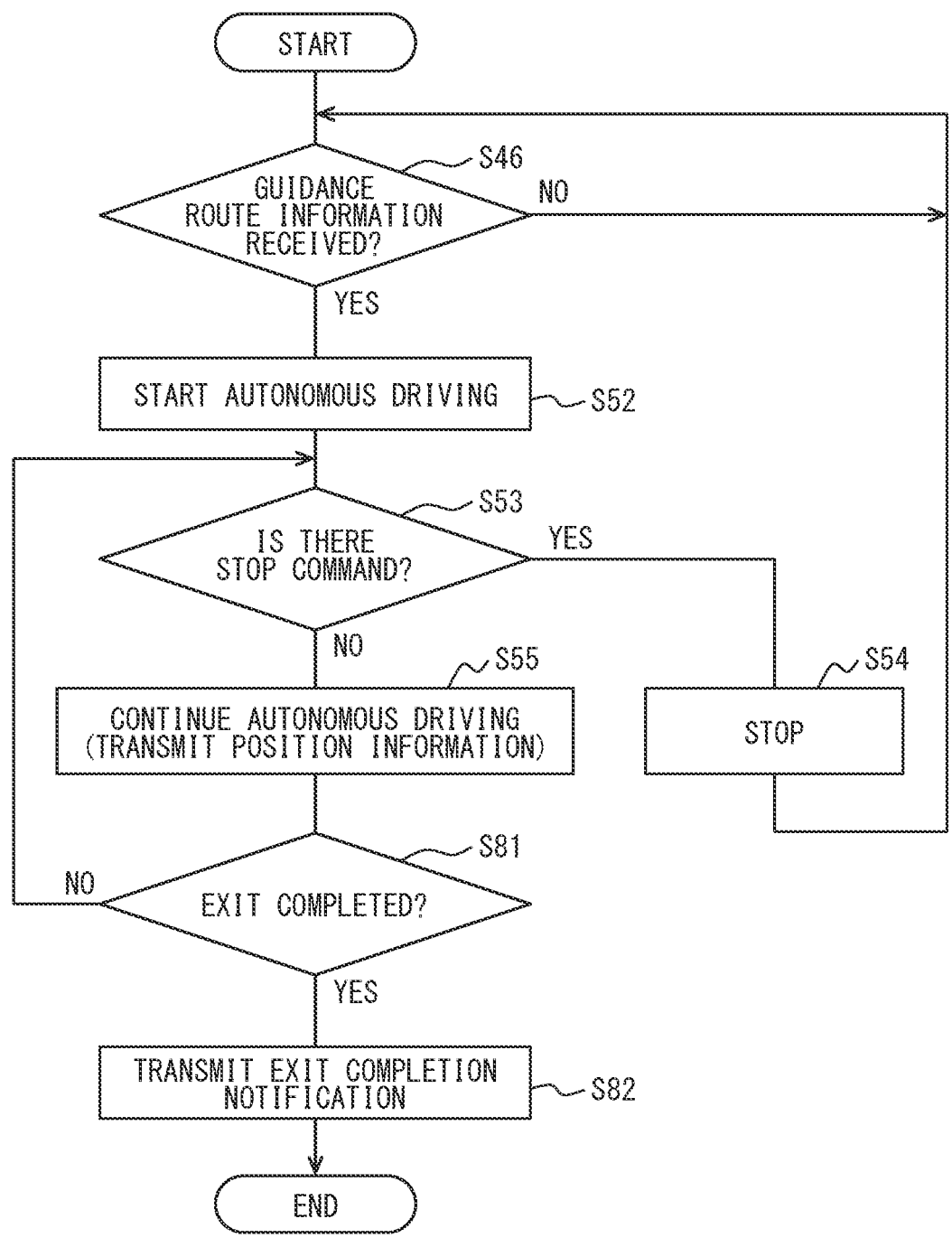
FIG. 9 is a flowchart of an automatic exit process performed by the autonomous driving vehicle.

In the automatic exit process, as illustrated in FIG. 9, the control unit 69 performs the processes of S46 and S52 to S55 in the automatic parking process described above. After S55, the control unit 69 determines whether the exit has been completed in S81. When it is detected that the autonomous driving vehicle 18 has arrived in the exit room 5 which is the target position or the parking lot 7, the control unit 69 determines that the exit has been completed.

When the exit has not been completed, the process returns to S53. When the exit has been completed, the control unit 69 transmits an exit completion notification to the management device 39 in S82, and ends the automatic exit process.

[1-3. Effects]

According to the embodiment described in detail above, the following effects are obtained.

(1a) An aspect of the present disclosure is the management device 39 configured to assist parking of a vehicle. The autonomous driving vehicle 18 is a vehicle configured to be allowed to perform autonomous driving to a target position set by the management device 39 in a parking lot.

Management device 39 includes the entry guidance unit 47A and the first cancellation guidance unit 47B. The position of the autonomous driving vehicle 18 before the start of movement is set to the entry initial position, and the parking area is set to the first target position.

Upon receiving a parking request to guide the autonomous driving vehicle 18 to a parking area in the parking lot, the entry guidance unit 47A is configured to guide the autonomous driving vehicle 18 from the entry initial position to the first target position. Upon receiving a parking cancellation request to cancel the parking request before the autonomous driving vehicle 18 arrives at the first target position, the first cancellation guidance unit 47B sets the second target position at a different position in the parking lot according to the positional relationship between the entry initial position and the current position of the autonomous driving vehicle 18, and guides the autonomous driving vehicle 18 to the second target position.

According to such a configuration, when the parking request is canceled, an appropriate target position can be set in view of the positional relationship between the entry initial position and the current position of the autonomous driving vehicle 18.

(1b) Another aspect of the present disclosure is the management device 39 configured to assist parking of a vehicle. The autonomous driving vehicle 18 is a vehicle configured to be allowed to perform autonomous driving to a target position set by the management device 39 in a parking lot.

Management device 39 includes the entry guidance unit 47A and the first cancellation guidance unit 47B. The position of the autonomous driving vehicle 18 before the start of movement is set to the entry initial position, and the parking area is set to the first target position.

Upon receiving a parking request from the user to guide the autonomous driving vehicle 18 to a parking area in the parking lot, the entry guidance unit 47A is configured to guide the autonomous driving vehicle 18 from the entry initial position to the first target position. Upon receiving a parking cancellation request to cancel the parking request from the user before the autonomous driving vehicle 18 arrives at the first target position, the first cancellation guidance unit 47B sets the second target position at a different position in the parking lot according to the positional relationship between the entry initial position and the current position of the autonomous driving vehicle 18, and guides the autonomous driving vehicle 18 to the second target position.

According to such a configuration, when the user desires to cancel the parking request, an appropriate target position can be set according to the positional relationship between the entry initial position and the current position of the autonomous driving vehicle 18.

(1c) In an aspect of the present disclosure, upon receiving a parking cancellation request, the stop transmission unit 47C is configured to transmit a stop command to autonomous driving vehicle 18 before the first cancellation guidance unit 47B sets the second target position.

According to such a configuration, when the parking cancellation request is received, the autonomous driving vehicle 18 is immediately stopped, so that it is possible to minimize the positional deviation of the current position when guiding the vehicle to the second target position.

(1d) In an aspect of the present disclosure, the stop transmission unit 47C transmits a stop command without determining the traveling state of the autonomous driving vehicle 18.

According to such a configuration, since the stop command is transmitted without judging the traveling state of the autonomous driving vehicle 18, the algorithm can be simplified as compared with the case of judging the traveling state of the autonomous driving vehicle 18. Therefore, the autonomous driving vehicle 18 can be stopped earlier.

(1e) In an aspect of the present disclosure, the entry initial position is set so as to be located in an initial zone representing a zone where the autonomous driving vehicle 18 can be parked. The position determination unit 47D is configured to determine whether the position of autonomous driving vehicle 18 is within the initial zone when receiving the parking cancellation request. The first cancellation guidance unit 47B is configured to set the second target position in the getting-on area in the parking lot when the position of autonomous driving vehicle 18 is outside the initial zone.

According to such a configuration, it is possible to prepare for a situation in which another vehicle enters the initial zone immediately after the autonomous driving vehicle 18 leaves the initial zone. That is, it is possible to suppress contact between the autonomous driving vehicle 18 and another vehicle in the initial zone and an emergency stop of the autonomous driving vehicle 18 avoiding contact with another vehicle.

(1f) In an aspect of the present disclosure, the first cancellation guidance unit 47B is configured to set the second target position in the initial zone when the position of autonomous driving vehicle 18 is in the initial zone. When at least part of the autonomous driving vehicle 18 is within the initial zone, it is configured to set the second target position in the initial zone.

According to such a configuration, if the time is before the autonomous driving vehicle 18 leaves the initial zone, the autonomous driving vehicle 18 can be caused to stay in the initial zone that is the position where the user has got off, so that the position of the autonomous driving vehicle 18 can be easily understood by the user.

(1g) In an aspect of the present disclosure, the exit guidance unit 47E is configured to regard the position of the autonomous driving vehicle 18 before the start of movement as the exit initial position and the getting-on area as the third target position and guide the autonomous driving vehicle 18 from the exit initial position to the third target position upon receiving the exit request to guide the autonomous driving vehicle 18 to the getting-on area in the parking lot from the user.

Upon receiving an exit cancellation request to cancel the exit request from the user before the autonomous driving vehicle 18 arrives at the third target position, the second cancellation guidance unit 47F sets the fourth target position in the parking area and guides the autonomous driving vehicle 18 to the fourth target position.

According to such a configuration, when the user wants to cancel the exit request, the target position can be set in the parking area.

(1h) In an aspect of the present disclosure, the parking area includes a plurality of parking zones in each of which at least one autonomous driving vehicle 18 can be parked. The parking zone available for parking indicates a zone in the vacant state. The second cancellation guidance unit 47F is configured to set the fourth target position in the parking zone closest to the third target position.

The second cancellation guidance unit 47F may be configured to extract, among getting-on areas in the parking lot, a zone in the vacant state closest to the position of the autonomous driving vehicle at the time of receiving the exit cancellation request. The second cancellation guidance unit 47F may be configured to set the fourth target position in a zone closest to the extracted zone of the getting-on area among the parking zones in the vacant state of the parking area.

According to such a configuration, it is possible to park the autonomous driving vehicle 18 temporarily taken in again, that is, the autonomous driving vehicle 18 having a high possibility of immediately taken out, at a position where the vehicle can be immediately taken out.

(1i) In an aspect of the present disclosure, the entry guidance unit 47A is configured to transmit at least part of map data related to the parking lot to autonomous driving vehicle 18 before first cancellation guidance unit 47B sets the second target position.

According to such a configuration, even when a parking cancellation request is received after receiving the parking request, the map data is delivered to the autonomous driving vehicle 18, so that it is possible to suppress a problem caused by the autonomous driving vehicle 18 not having the map data. Alternatively, an algorithm for suppressing a problem caused by the autonomous driving vehicle 18 not having the map data can be made unnecessary.

(1j) In an aspect of the present disclosure, the stop transmission unit 47C is configured to transmit, upon receiving the parking cancellation request, a stop command to the autonomous driving vehicle before the second cancellation guidance unit 47F sets the fourth target position.

According to such a configuration, before setting the fourth target position, the management device 39 can transmit a stop command to the autonomous driving vehicle 18 to stop the autonomous driving vehicle 18. Therefore, the fourth target position can be set more safely.

(1k) In an aspect of the present disclosure, the stop transmission unit 47C is configured to transmit a stop command without judging a traveling state of the autonomous driving vehicle.

According to such a configuration, since the management device 39 transmits the stop command without judging the traveling state of the autonomous driving vehicle 18, the autonomous driving vehicle 18 can be stopped earlier.

(1l) In an aspect of the present disclosure, the parking cancellation request is input by a user of the autonomous driving vehicle 18.

According to such a configuration, the user can input the parking cancellation request using any device such as the terminal device 43, and the management device 39 can perform the process by recognizing the parking cancellation request.

2. Other Embodiments

Although the embodiments of the present disclosure have been described above, the present disclosure is not limited to the above-described embodiments, and various modifications can be made.

(2a) In the above embodiment, when the exit request is received after the parking request, a new target position is set according to whether the autonomous driving vehicle 18 has left the zone of the entry room 3, but the present invention is not limited thereto. For example, the distance from the current position of the autonomous driving vehicle 18 to the entry room 3 may be compared with the distance to the exit room 5, and the autonomous driving vehicle 18 may be guided to the compartment having the shorter distance.

In this case, the entry room 3 may be provided with a suppression device such as a shutter or a traffic light that suppresses entry of other vehicles. According to such a configuration, the convenience of the user can be improved more safely.

For example, a suppression device such as a shutter or a gate may be provided at a position through which the autonomous driving vehicle 18 passes in the entry room 3. The suppression device such as a shutter or a gate is controlled by the management device 39, and is configured to be able to transition between an open state in which the autonomous driving vehicle 18 can pass and a closed state in which the autonomous driving vehicle cannot pass. The suppression device is in an open state when the autonomous driving vehicle 18 can enter the entry room 3, that is, when the autonomous driving vehicle can pass through the entry room 3. On the other hand, the suppression device is in the closed state under the condition that the entry of the autonomous driving vehicle 18 is prohibited. The condition that the entry of the autonomous driving vehicle 18 is prohibited is, for example, when another autonomous driving vehicle 18 is present in the entry room 3, when at least part of another autonomous driving vehicle 18 is present in the entry room 3, and when a user of another autonomous driving vehicle 18 instructs the automatic parking process. The suppression device set to the closed state may be configured to be changed to the open state when the preparation for accepting the entry of the next autonomous driving vehicle 18 is completed.

(2b) In the above embodiment, when the control unit 47 selects a zone that is the target position, a zone having the shortest distance to the autonomous driving vehicle 18 may be selected, or a zone having the shortest traveling time of the autonomous driving vehicle 18 may be selected. Furthermore, the control unit 47 may select not only a zone with the shortest distance or the shortest time but also a zone in which the autonomous driving vehicle 18 can move within a preset time.

(2c) In the above embodiment, first cancellation guidance unit 47B may cause terminal device 43 to which the parking cancellation request is input to display an image indicating the first cancellation request and an image indicating the second cancellation request as the parking cancellation request. The first cancellation request is selected when the autonomous driving vehicle 18 leave the parking lot 7. The second cancellation request is selected when the autonomous driving vehicle 18 is parked in a parking area within a predetermined time.

When the user performs an input operation on the terminal device 43 to transmit a parking cancellation request to the management device 39 before the autonomous driving vehicle 18 arrives in the parking lot 7 after the parking request signal is output from the terminal device 43, the display unit of the terminal device 43 may display an image indicating the exit and an image indicating the temporary exit in order to reflect the user's intention. In other words, the display unit of the terminal device 43 may display a plurality of images associated with a plurality of different requests, and cause the user to select any one of the images.

The image indicating the exit corresponds to the image indicating the first cancellation request, and is, for example, a button image displaying "cancel parking". The image indicating the temporary exit corresponds to the image indicating the second cancellation request, and is, for example, a button image displaying "temporary return".

The image indicating the exit is selected, for example, in a case where the user has an intention of leaving the facility 22. The image indicating the temporary exit is selected, for example, when the automatic parking process is performed again within a predetermined time (for example, within 10 minutes) after the user returns to the autonomous driving vehicle 18.

When the user selects the image indicating the exit, the parking position set in S21 of the autonomous driving vehicle entry process is released. When the set parking position is released, the management device 39 may set the parking position as a zone in a vacant state. As a result, another autonomous driving vehicle 18 can set this zone as the end point of the guidance route.

When the user selects the image indicating the temporary exit, the parking position set in S21 of the autonomous driving vehicle entry process may be secured as the parking position of the autonomous driving vehicle 18. When the set parking position is secured, another autonomous driving vehicle 18 cannot set this zone as the end point of the guidance route. Alternatively, the management device 39 may determine whether to secure the parking position of the autonomous driving vehicle 18 to make a temporary exit according to the number of zones in the vacant state of the parking lot 7. That is, when there is a plurality of zones in the vacant state, the parking position of the autonomous driving vehicle 18 to make a temporary exit is not secured, and when there is one zone in the vacant state, the parking position of the autonomous driving vehicle 18 to make a temporary exit may be secured. Alternatively, the parking lot 7 may be provided with a parking zone dedicated to the autonomous driving vehicle 18 to make a temporary exit. In this case, when the user selects the image indicating the temporary exit, the parking position set in S21 of the autonomous driving vehicle entry process may be released. In the configuration described in detail above, the second cancellation guidance unit 47F causes the terminal device 43 to which the parking cancellation request is input by the user to display the image indicating the first cancellation request and the image indicating the second cancellation request as the parking cancellation request. The image indicating the first cancellation request is an image selected when the autonomous driving vehicle 18 exits from the parking lot. The image indicating the second cancellation request is an image selected when the autonomous driving vehicle is parked in the parking area within a predetermined time.

For example, an image indicating the first cancellation request is associated with a command to release the parking position where the autonomous driving vehicle 18 has been parked so far, and an image indicating the second cancellation request is associated with a command to secure the parking position where the autonomous driving vehicle 18 has been parked so far.

According to such a configuration, by allowing the user to select the image, it is possible to distinguishingly control the exit for the autonomous driving vehicle 18 to exit from the parking lot and the temporary exit for causing the vehicle to make an exit on the premise that the autonomous driving vehicle 18 returns to the parking area again without leaving the parking lot.

(2d) In the above embodiment, the exit request signal may be generated by triggering an operation other than the user's operation. For example, the management device 39 may determine the state of the autonomous driving vehicle 18 and generate the exit request signal based on the determination result. Hereinafter, an example in which the control unit 47 of the management device 39 generates the exit request signal will be described. This process is started when the management device 39 is powered on, and is repeatedly performed thereafter.

For example, when determining that continuation of automatic parking of the autonomous driving vehicle 18 is difficult in the middle of entry, the control unit 47 generates an exit request signal for the autonomous driving vehicle 18. An example in which the exit request signal is generated based on the position information about the autonomous driving vehicle 18 will be described.

The first cancellation guidance unit 47B calculates a divergence distance (also referred to as a difference) between the position information about the autonomous driving vehicle 18 estimated by the position information acquisition unit 73 and the position information about the autonomous driving vehicle 18 detected by the management device 39 based on the information supplied by the infrastructure 41. When the divergence distance is equal to or more than the predetermined threshold value, it is determined that there is an anomaly in the position estimation of the autonomous driving vehicle 18. In order to cancel the autonomous driving vehicle entry process, the exit request signal is output.

The infrastructure 41 includes a marker disposed in the parking lot in addition to a camera that captures the inside of the parking assist system 1, a rider, and the like. The marker is set, for example, at a passage of the parking lot 7. The position information acquisition unit 73 performs position estimation using, for example, an image captured by a camera of the sensor group 71 and point group data of the rider. When the autonomous driving is started, the position information acquisition unit 73 repeatedly transmits to the management device 39 the estimation result of the current position as position information (referred to as estimated position information) of the autonomous driving vehicle 18.

The management device 39 obtains position information (referred to as detected position information) of the autonomous driving vehicle 18 based on the parking lot inside information supplied by the infrastructure 41.

The management device 39 has the estimated position information and the detected position information with respect to the autonomous driving vehicle 18 by receiving the estimated position information from the autonomous driving vehicle 18. The estimated position information and the detected position information are expressed, for example, as coordinate values in the area of the parking lot.

The first cancellation guidance unit 47B calculates a divergence distance between the coordinate value corresponding to the estimated position information and the coordinate value corresponding to the detected position information. When the divergence distance exceeds the predetermined value, it is determined that there is an anomaly in the position estimation of the autonomous driving vehicle 18. In this case, the first cancellation guidance unit 47B determines that the autonomous driving vehicle entry process cannot be continued. When it is determined that the autonomous driving vehicle entry process cannot be continued, the first cancellation guidance unit 47B generates an exit request signal.

When the divergence distance is less than the predetermined value, the entry guidance unit 47A determines that the autonomous driving vehicle entry process can be continued. In this case, the exit request signal is not generated.

The management device 39 may receive data indicating the operation state of the automatic valet parking function of the autonomous driving vehicle 18 or the vehicle state and determine whether the autonomous driving vehicle entry process can be continued. When determining that the autonomous driving vehicle entry process cannot be continued based on the data received from the autonomous driving vehicle 18, the first cancellation guidance unit 47B may generate the exit request signal. The data indicating the vehicle state is, for example, data that can diagnose an anomaly, such as a failure diagnosis result of the autonomous driving vehicle 18 and sensor values of air pressure, temperature, remaining fuel, and the like of the autonomous driving vehicle 18.

(2e) A plurality of functions of one component in the above embodiment may be implemented by a plurality of components, or one function of one component may be implemented by a plurality of components. A plurality of functions of a plurality of components may be implemented by one component, or one function realized by a plurality of components may be implemented by one component. Part of the configuration of the above embodiment may be omitted.

At least part of the configuration of the above embodiment may be added to or replaced with the configuration of another above embodiment.

(2f) In addition to the management device 39 described above, the present disclosure can be implemented in various forms such as the parking assist system 1 including the management device 39 as a component, a program for causing a computer to function as the management device 39, a non-transitory tangible recording medium such as a semiconductor memory in which the program is recorded, and a driving assist method.

The invention claimed is:

1. A parking assist apparatus configured to assist parking of an autonomous driving vehicle, the autonomous driving vehicle being configured to perform autonomous driving to a target position in a parking lot set by the parking assist apparatus, the parking assist apparatus comprising:
an entry guidance unit configured to, upon receiving a parking request for guiding the autonomous driving vehicle to a parking area in the parking lot, guide the autonomous driving vehicle from an entry initial position, which is a position of the autonomous driving vehicle immediately before starting an entry guidance, to the parking area, as a first target position; and
a cancellation guidance unit configured to, upon receiving a parking cancellation request for cancelling the parking request before the autonomous driving vehicle arrives at the first target position:
set a second target position that is a different position in the parking lot according to a positional relationship of a current position of the autonomous driving vehicle relative to the entry initial position; and
guide the autonomous driving vehicle to the second target position, wherein
the entry initial position is located in an initial zone where the autonomous driving vehicle is allowed to be parked,
the parking assist apparatus further comprises
a position determination unit configured to determine, upon receiving the parking cancellation request, whether a position of the autonomous driving vehicle is within the initial zone, and
the cancellation guidance unit is configured to set the second target position in a getting-on area in the parking lot when the position of the autonomous driving vehicle is determined to be outside of the initial zone.

2. The parking assist apparatus according to claim 1, further comprising:
a stop transmission unit configured to transmit, upon receiving the parking cancellation request, a stop command to the autonomous driving vehicle before the cancellation guidance unit sets the second target position.

3. The parking assist apparatus according to claim 2, wherein the stop transmission unit is configured to transmit the stop command without judging a traveling state of the autonomous driving vehicle.

4. The parking assist apparatus according to claim 1, wherein
the cancellation guidance unit is configured to set the second target position in the initial zone when the position of the autonomous driving vehicle is determined to be within the initial zone.

5. The parking assist apparatus according to claim 1, wherein
the cancellation guidance unit is a first cancellation guidance unit,
the parking assist apparatus further comprises:
an exit guidance unit configured to, upon receiving an exit request for guiding the autonomous driving vehicle to the getting-on area in the parking lot from a user, guide the autonomous driving vehicle from an exit initial position, which is a position of the autonomous driving vehicle immediately before starting an exit guidance, to the getting-on area, as a third target position; and
a second cancellation guidance unit configured to, upon receiving an exit cancellation request for cancelling the exit request from the user before the autonomous driving vehicle arrives at the third target position:
set a fourth target position in the parking area; and
guide the autonomous driving vehicle to the fourth target position.

6. The parking assist apparatus according to claim 5, wherein
the parking area includes a plurality of parking zones and at least one autonomous driving vehicle is allowed to be parked in each of the plurality of parking zones, and
the second cancellation guidance unit is configured to set one of the plurality of parking zones that is closest to the third target position as the fourth target position.

7. The parking assist apparatus according to claim 5, wherein
the parking area includes a plurality of parking zones and at least one autonomous driving vehicle is allowed to be parked in each of the plurality of parking zones, and
the second cancellation guidance unit is configured to:
select one of a plurality of getting-on zones in the getting-on area that is vacant and closest to a current position of the autonomous driving vehicle at a timing of receiving the exit cancellation request; and
set one of the plurality of parking zones in the parking area that is closest to the selected getting-on zone of the getting-on area as the fourth target position.

8. The parking assist apparatus according to claim 6, further comprising:
a stop transmission unit configured to transmit, upon receiving the parking cancellation request, a stop command to the autonomous driving vehicle before the second cancellation guidance unit sets the fourth target position.

9. The parking assist apparatus according to claim 8, wherein
the stop transmission unit is configured to transmit the stop command without judging a traveling state of the autonomous driving vehicle.

10. The parking assist apparatus according to claim 1, wherein
the entry guidance unit is configured to transmit at least part of map data regarding the parking lot to the autonomous driving vehicle before the cancellation guidance unit sets the second target position.

11. The parking assist apparatus according to claim 1, wherein
the parking cancellation request is input by a user of the autonomous driving vehicle.

12. The parking assist apparatus according to claim 11, wherein
the cancellation guidance unit is configured to cause a terminal device of the user for inputting the parking cancellation request to selectively display, as the parking cancellation request, a first image indicative of a first cancellation request and a second image indicative of a second cancellation request, the first image is selected when the autonomous driving vehicle exits the parking lot, and the second image is selected when the autonomous driving vehicle is to be parked in the parking area within a predetermined time.

13. A parking assist method performed by a parking assist apparatus configured to assist parking of an autonomous driving vehicle, the autonomous driving vehicle being configured to perform autonomous driving to a target position in a parking lot set by the parking assist apparatus, the parking assist method comprising:

upon receiving a parking request for guiding the autonomous driving vehicle to a parking area in the parking lot, guiding the autonomous driving vehicle from an entry initial position, which is a position of the autonomous driving vehicle immediately before starting an entry guidance, to the parking area, as a first target position;

upon receiving a parking cancellation request for cancelling the parking request before the autonomous driving vehicle arrives at the first target position, setting a second target position that is a different position in the parking lot according to a positional relationship of a current position of the autonomous driving vehicle relative to the entry initial position; and guiding the autonomous driving vehicle to the second target position, wherein the entry initial position is located in an initial zone where the autonomous driving vehicle is allowed to be parked, the parking assist method further comprises determining, upon receiving the parking cancellation request, whether a position of the autonomous driving vehicle is within the initial zone, and setting the second target position in a getting-on area in the parking lot when the position of the autonomous driving vehicle is determined to be outside of the initial zone.

14. A parking assist apparatus configured to assist parking of an autonomous driving vehicle, the autonomous driving vehicle being configured to perform autonomous driving to a target position in a parking lot set by the parking assist apparatus, the parking assist apparatus comprising at least one processor programmed to:

upon receiving a parking request for guiding the autonomous driving vehicle to a parking area in the parking lot, guide the autonomous driving vehicle from an entry initial position, which is a position of the autonomous driving vehicle immediately before starting an entry guidance, to the parking area, as a first target position;

upon receiving a parking cancellation request for cancelling the parking request before the autonomous driving vehicle arrives at the first target position, set a second target position that is a different position in the parking lot according to a positional relationship of a current position of the autonomous driving vehicle relative to the entry initial position; and guide the autonomous driving vehicle to the second target position, wherein the entry initial position is located in an initial zone where the autonomous driving vehicle is allowed to be parked, the at least one processor further programmed to determine, upon receiving the parking cancellation request, whether a position of the autonomous driving vehicle is within the initial zone, and set the second target position in a getting-on area in the parking lot when the position of the autonomous driving vehicle is determined to be outside of the initial zone.

* * * * *